US008326968B1

(12) United States Patent
Drescher

(10) Patent No.: US 8,326,968 B1
(45) Date of Patent: Dec. 4, 2012

(54) MULTI-LINK CORRELATION

(75) Inventor: Keith A. Drescher, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1151 days.

(21) Appl. No.: 11/442,830

(22) Filed: May 30, 2006

(51) Int. Cl.
G06F 15/173 (2006.01)
(52) U.S. Cl. ............... 709/224; 709/205; 709/225
(58) Field of Classification Search ............... 709/224, 709/205, 225
See application file for complete search history.

(56) References Cited

U.S. PATENT DOCUMENTS

| | | | |
|---|---|---|---|
| 6,009,488 A | 12/1999 | Kavipurapu | |
| 2002/0087806 A1* | 7/2002 | Gharachorloo et al. | 711/141 |
| 2002/0169815 A1* | 11/2002 | Wong et al. | 709/100 |
| 2004/0078709 A1* | 4/2004 | Beukema et al. | 714/43 |
| 2006/0155843 A1* | 7/2006 | Glass et al. | 709/224 |
| 2006/0182039 A1* | 8/2006 | Jourdain et al. | 370/252 |
| 2007/0053294 A1* | 3/2007 | Ho et al. | 370/235 |

OTHER PUBLICATIONS

U.S. Appl. No. 11/167,965, filed Jun. 27, 2005, 21 pages.

* cited by examiner

*Primary Examiner* — Larry Donaghue
*Assistant Examiner* — Nicholas Taylor
(74) *Attorney, Agent, or Firm* — Caven & Aghevli LLC

(57) ABSTRACT

Methods and apparatus to correlate data communicated over multiple communication links are described. In one embodiment, one or more unique identifiers are transmitted by a plurality of communication links of a transmit agent. In an embodiment, the unique identifiers may be utilized to correlate data communicated over the plurality of the communication links of the transmit agent. Other embodiments are also disclosed.

15 Claims, 6 Drawing Sheets

MULTI-LINK CORRELATION

BACKGROUND

The present disclosure generally relates to the field of electronics. More particularly, an embodiment of the invention relates to correlation of data communicated over multiple communication links.

To validate or debug components of a computer system, a logic analyzer may be used to capture and analyze data exchanged between the components. Some components may utilize multiple communication links or interfaces, and the traffic occurring on the various interfaces may interact. Hence, validation and debug of such components may require knowledge of the traffic that is simultaneously occurring on the multiple interfaces.

Moreover, separate logic analyzers may be used to capture the data communicated via each interface. However, correlating the data captured from the different interfaces may be difficult to achieve, in part, due to timing differences. More particularly, depending on system load, data communicated over different interfaces at the same time may be captured at different times. Also, as data propagates through additional interfaces, the time difference may further deviate from the actual time.

Alternatively, a single logic analyzer may be used to capture and correlate data from different interfaces of a system. However, single logic analyzer implementations may involve the use of a costly logic analysis system (e.g., a mainframe system) that may not interoperate with other types of trace capture systems.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide efficient mechanisms for data correlation between communication links or interfaces (e.g., corresponding to high-speed serial links) of a computing system component, such as the components discussed herein, e.g., with reference to FIGS. 1-6. In some embodiments, the data correlation may be provided for communication links that are implemented in accordance with the same or different technologies. Further, data correlation provided by applying some of the embodiments discussed herein may be implemented at a lower cost and/or with lower inefficiencies, for example, when compared with some current (e.g., mainframe based) implementations.

Figure 1:
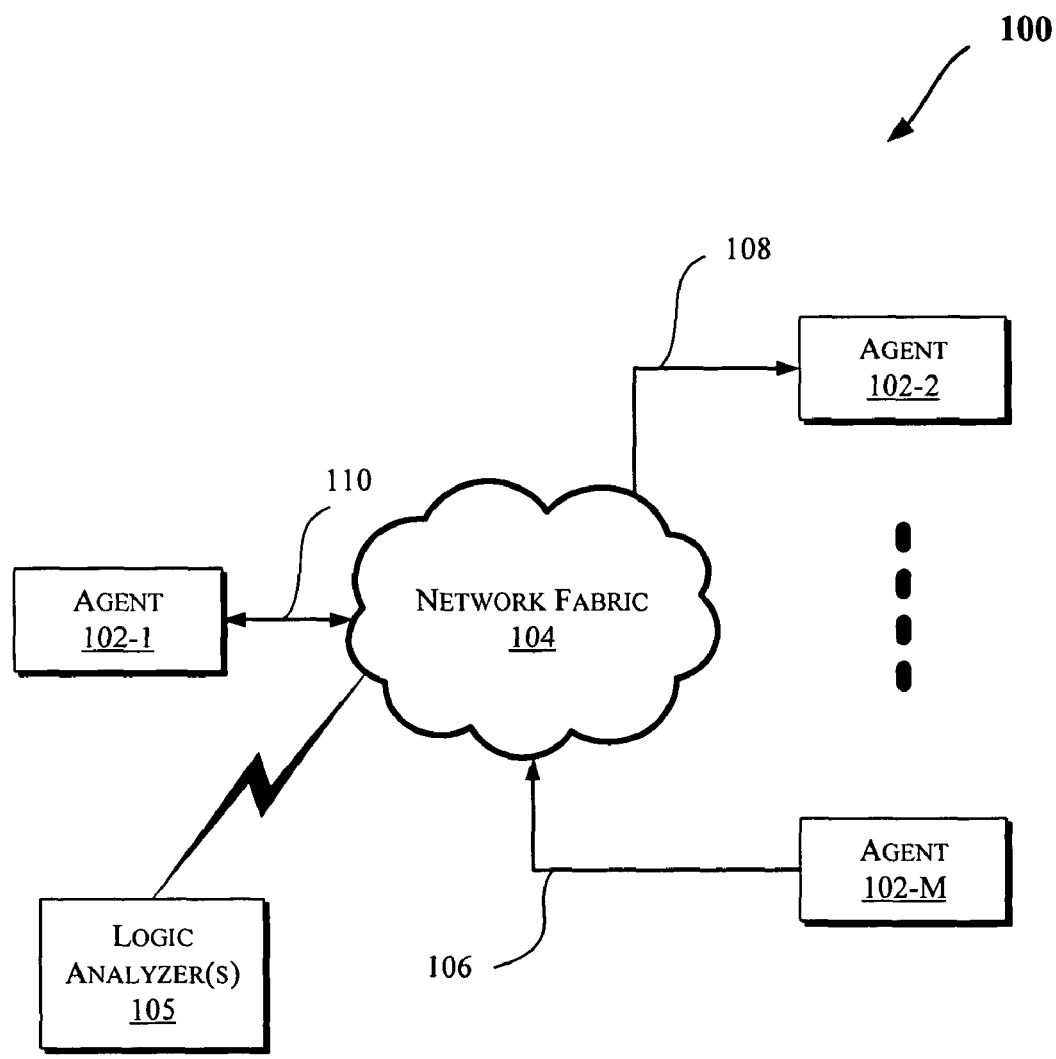
FIGS. 1, 5, and 6 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIG. 5 or 6.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers 105). The debug information may be in turn utilized (e.g., decoded in real time) to enable trace capture framing at various points of interest or events.

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Figure 2:
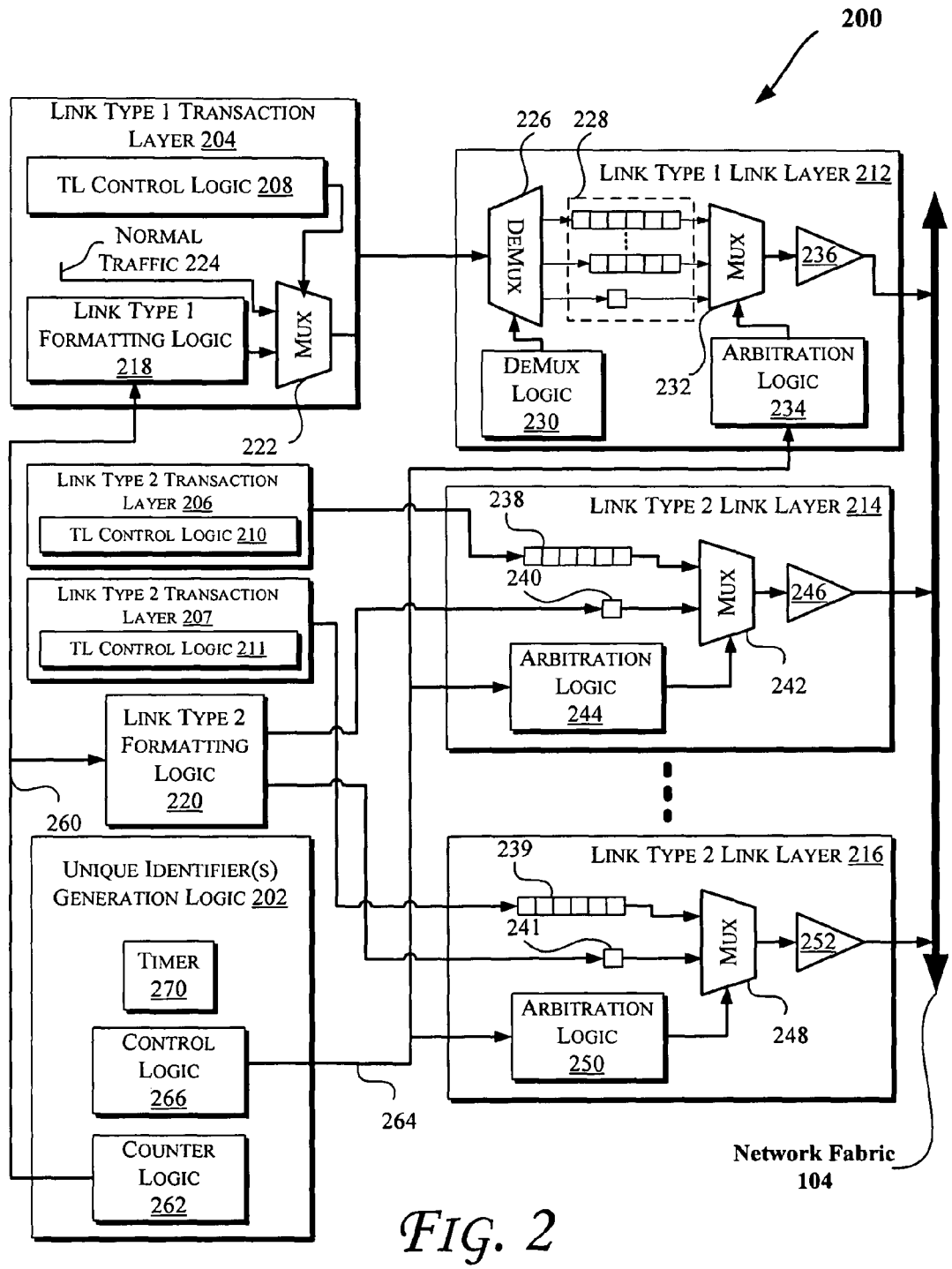
FIG. 2 illustrates a block diagram of portions of a transmit agent, according to an embodiment.

FIG. 2 illustrates a block diagram of portions of a transmit agent 200, according to an embodiment. In one embodiment, the transmit agent 200 may be implemented by one of the agents 102-1 and/or 102-M discussed with reference to FIG. 1. Further details regarding some of the operation of the transmit agent 200 will be discussed herein with reference to FIGS. 3 and 4.

The transmit agent 200 may include a logic 202 to generate one or more unique identifiers. The transmit agent 200 may also include one or more transaction layers (e.g., link type 1 transaction layer 204 and link type 2 transaction layers 206 and 207). Each of the transaction layers 204, 206, and 207 may include logic (e.g., logics 208, 210, and 211, respectively) to control the flow of data (e.g., including normal traffic and/or debug data) to other components of the transmit agent 200 such as one or more link layers (e.g., link layers 212, 214, and/or 216). The transmit agent 200 may further include formatting logic(s) (e.g., link type 1 formatting logic 218 and/or link type 2 formatting logic 220) to perform formatting operations on data (e.g., including unique identifier(s) generated by the logic 202) so that unique identifier data may be transmitted by different types of links or interfaces, such as through the link layers 212-216, over the fabric 104 to other agents (e.g., such as agents 102-1 and/or 102-2 of FIG. 1).

As shown in FIG. 2, some embodiments may be applied to different types of links. For example, link type 1 may utilize the link type 1 transaction layer 204 and link layer 212; while link type 2 may utilize the transaction layers 206-207 and/or link layers 214 and/or 216. Other configurations are also possible, including more or less link types. Moreover, the transaction layer 204 may include a multiplexer 222 to combine normal data traffic 224 (which may provided as one or more data packets) with traffic including debug data from the logic 218 (e.g., based on a selection signal generated by the logic 208) to provide a single stream of data. Data transmitted by the transaction layer 204 may be received at a demultiplexer 226 which may de-multiplex the received data into one or more queues 228 in accordance with a signal generated by a logic 230. For example, different types of data (e.g., with differing priorities) may be de-multiplexed and stored in a corresponding queue (228). A multiplexer 232 may selectively (e.g., based on a signal generated by an arbitration logic 234) pass the stored data from queues 228 to a driver 236 for transmission over the fabric 104. In one embodiment, data (which may be formatted into a packet by the logic 218) including unique identifier(s) (such as those generated by the logic 202) may be stored in a separate queue 228 by the demultiplexer 226 to enable the multiplexer 232 to cause transmission of this data through the fabric 104 more responsively (e.g., closer to a real time basis) to limit potential time delays resulting from signal propagation between communication agents (such as agents 102 discussed with reference to FIG. 1). In an embodiment, data packets including the unique identifier(s) generated by the logic 202 may be ignored by receiving agents. Hence, such packets may be useful for debug and/or validation purposes as will be further discussed herein, e.g., with reference to FIGS. 3 and 4.

As for link type 2, as shown in FIG. 2, link layers 214 and 216 may each include a queue for normal traffic (queues 238 and 239, respectively) and a queue for traffic including unique identifier(s) such as those generated by the logic 202 (queues 240 and 241, respectively). Data stored in queues 238 and 240 may be multiplexed by a multiplexer 242 in accordance with a signal generated by an arbitration logic 244 for transmission over the fabric 104 via a driver 246. Also, data stored in queues 239 and 241 may be multiplexed by a multiplexer 248 in accordance with a signal generated by an arbitration logic 250 for transmission over the fabric 104 via a driver 252.

In an embodiment, the logic 202 may provide at least two signals to some of the components of the transmit agent 200. For example, a signal 260 may correspond to a unique identifier (e.g., that is generated by a counter logic 262 in an embodiment). A signal 264 may be generated by a control logic 266 and provided to the arbitration logics 234, 244 and 250. In one embodiment, signal 264 may indicate the presence of a unique identifier for transmission (e.g., an identifier that may be stored in the queues 228, 240, and/or 241).

As illustrated in FIG. 2, the logic 202 may also include a timer 270 to enable periodic triggering of signal generation (e.g., generation of signals 260 and 264). Accordingly, the timer 270 may cause inclusion of data packets corresponding to unique identifier(s) with normal traffic on a periodic basis (e.g., at programmable intervals). In an embodiment, the frequency of the timer 270 may be configurable by a user. For example, a user may program the timer 270 to cause inclusion of marker packet(s) (e.g., including unique identifier(s)) with normal traffic as appropriate for a given problem being investigated (e.g., during component debug and/or validation). Also, the frequency of the timer 270 may be configurable dynamically in accordance with various system inputs such as system load. Moreover, in some embodiments, the configurability of the timer 270 may be provided to allow a user (or other dynamic input) to tune the injection of marker packets, so that such packets have as little effect as possible on delivery of the normal traffic.

Figure 3:
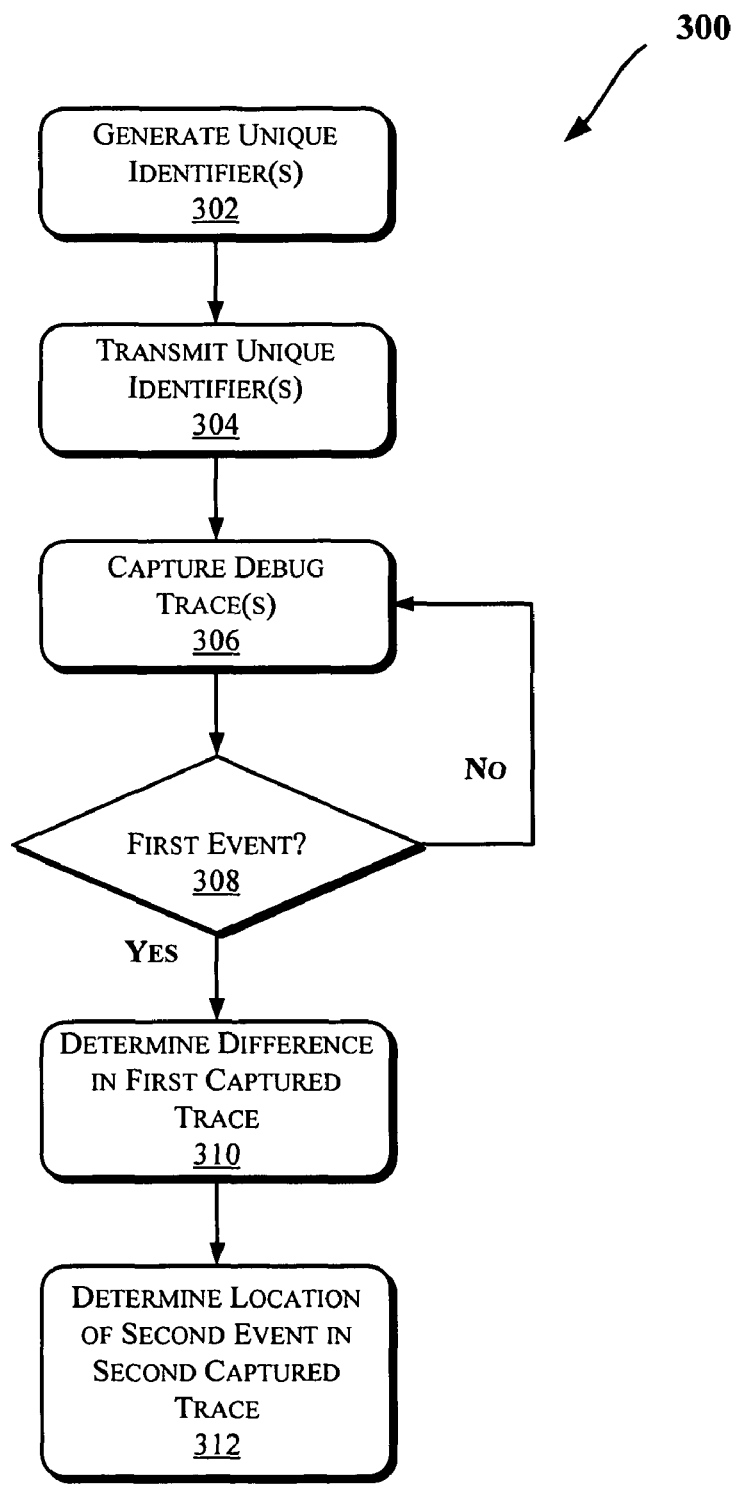
FIG. 3 illustrates a flow diagram of a method according to an embodiment.
Figure 4:
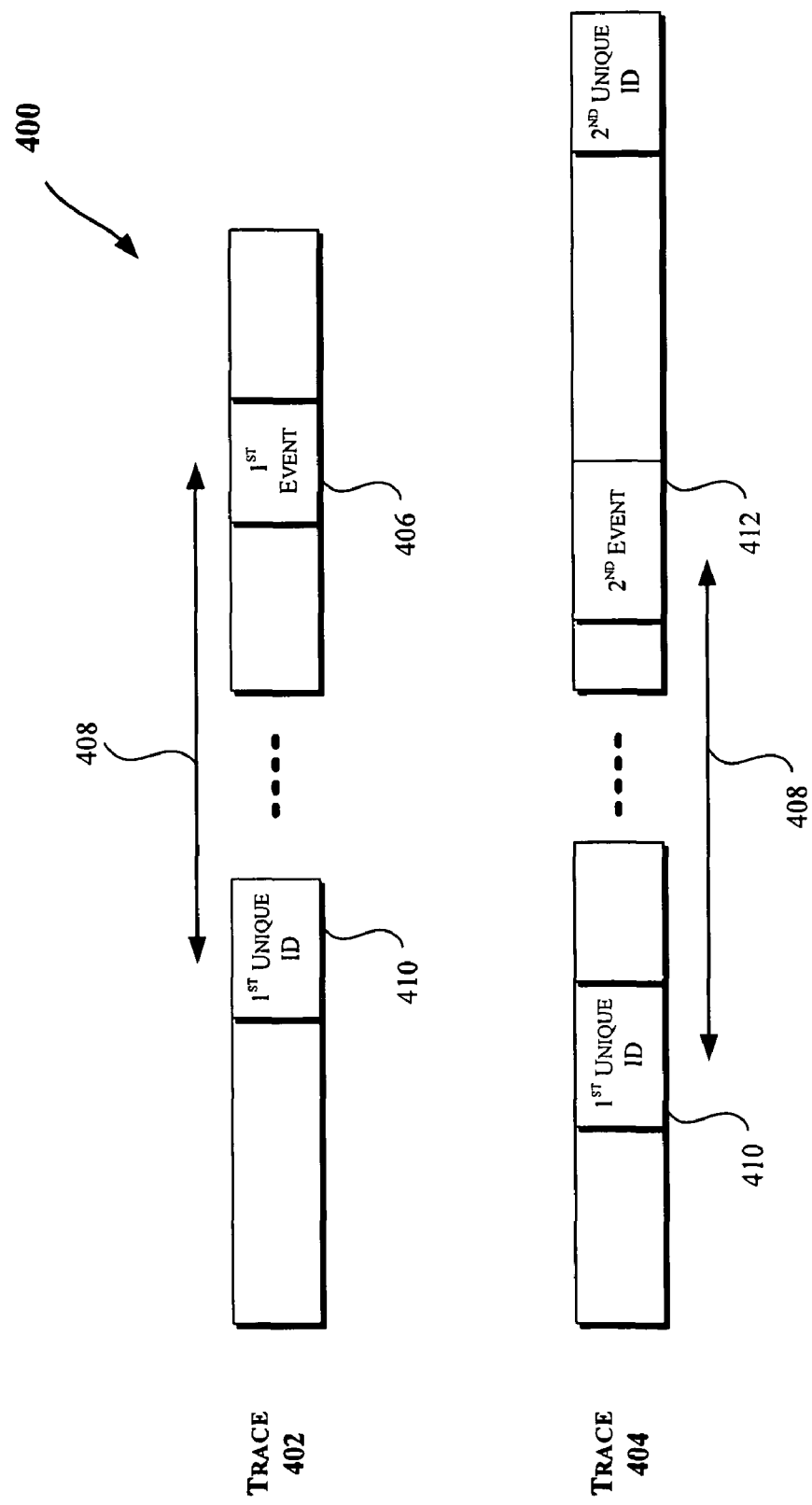
FIG. 4 illustrates sample traces that may be captured in accordance with an embodiment.

FIG. 3 illustrates a flow diagram of a method 300 to provide correlation of data communicated over multiple communication links, according to an embodiment. In an embodiment, various components discussed with reference to FIGS. 1-2 and 5-6 may be utilized to perform one or more of the operations discussed with reference to FIG. 3. FIG. 4 illustrates sample traces that may be captured (e.g., by the logic analyzer(s) 105 of FIG. 1) in accordance with some operations of method 300 of FIG. 3.

Referring to FIGS. 1-4, at an operation 302, the logic 202 may generate one or more unique identifiers. The generated unique identifier(s) may then be transmitted by link layers 212, 214, and/or 216 over the fabric 104 such as discussed with reference to FIG. 2 to a receiving agent (such as agents 102-1 and/or 102-2) at an operation 304. One or more channel traffic trace capture tools (such as logic analyzers 105) may capture traces of data transmitted by communication links of a transmit agent (such as link layers 212-216 of the transmit agent 200) over the fabric 104 at an operation 306. In an embodiment, each trace of captured data may correspond to data transmitted by one of the link layers 212-216. For instance, traces 402 and/or 404 may be captured at operation 306. In an embodiment, traces 402 and/or 404 may be stored in a memory (such as a memory in communication with the logic analyzer(s) 105) and/or the memories discussed with reference to FIGS. 5 and 6) for subsequent access.

During debug and/or component validation, at an operation 308, once a first event (or point) of interest 406 is determined (e.g., in trace 402), at an operation 310, a logic analyzer (105) may be used to determine a difference (or delta) 408 between the occurrence of the first event 406 and a first unique identifier 410. In various embodiments, operation 310 may be performed manually (e.g., by a user), by hardware, software, or combinations thereof. Also, the first unique identifier 410 may be selected based on various criterions. For example, the identifier 410 may be the nearest marker to the first event 406, such as the nearest preceding marker to the first event 406 or the nearest marker following the first event 406 (not shown). The unique identifier 410 may also be selected based on other criterions.

At an operation 312, the location of a second event 412 (which may correspond to the first event 406) may be determined based on offsetting the location of the first unique identifier 410 in the trace 404 by the delta 408 determined at operation 310. Accordingly, in accordance with some embodiments, data in different capture traces (402,404) may be correlated by utilizing unique identifier(s) (410) that are included with transmitted data.

Figure 5:
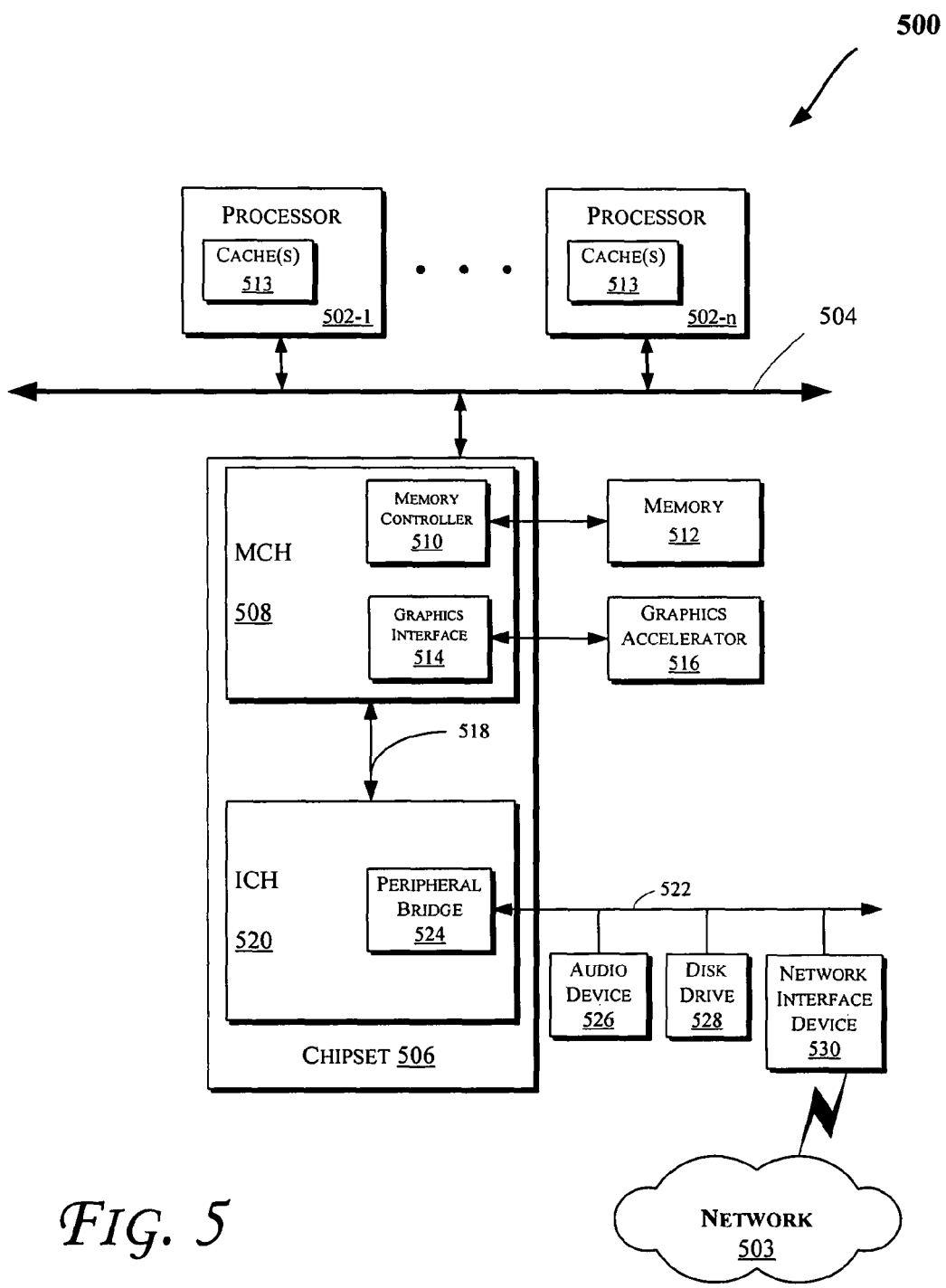

FIG. 5 illustrates a block diagram of a computing system 500 in accordance with an embodiment of the invention. The computing system 500 may include one or more central processing unit(s) (CPUs) 502 or processors (collectively referred to herein as "processors 502" or more generally "processor 502") that communicate via an interconnection network (or bus) 504. The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512. The memory 512 may store data, including sequences of instructions that are executed by the CPU 502, or any other device included in the computing system 500. For example, the memory 512 may store data corresponding to traces 402 and 404 of FIG. 4. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

Additionally, one or more of the processors 502 may have access to one or more caches 513 (which may include private and/or shared caches in various embodiments) and associated cache controllers (not shown). The cache(s) 513 may adhere to one or more cache coherent protocols. The cache(s) 513 may store data (e.g., including instructions) that are utilized by one or more components of the system 500. For example, the cache 513 may locally cache data stored in a memory 512 for faster access by the components of the processors 502. In an embodiment, the cache 513 (that may be shared) may include a mid-level cache and/or a last level cache (LLC). Also, each processor 502 may include a level 1 (L1) cache. Various components of the processors 502 may communicate with the cache 513 directly, through a bus or interconnection network, and/or a memory controller or hub.

The MCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display (such as a flat panel display) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 518 may allow the MCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). Other devices may communicate via the bus 522. Also, various components (such as the network interface device 530) may communicate with the MCH 508 in some embodiments of the invention. In addition, the processor 502 and the MCH 508 may be combined to form a single chip. Furthermore, the graphics accelerator 516 may be included within the MCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
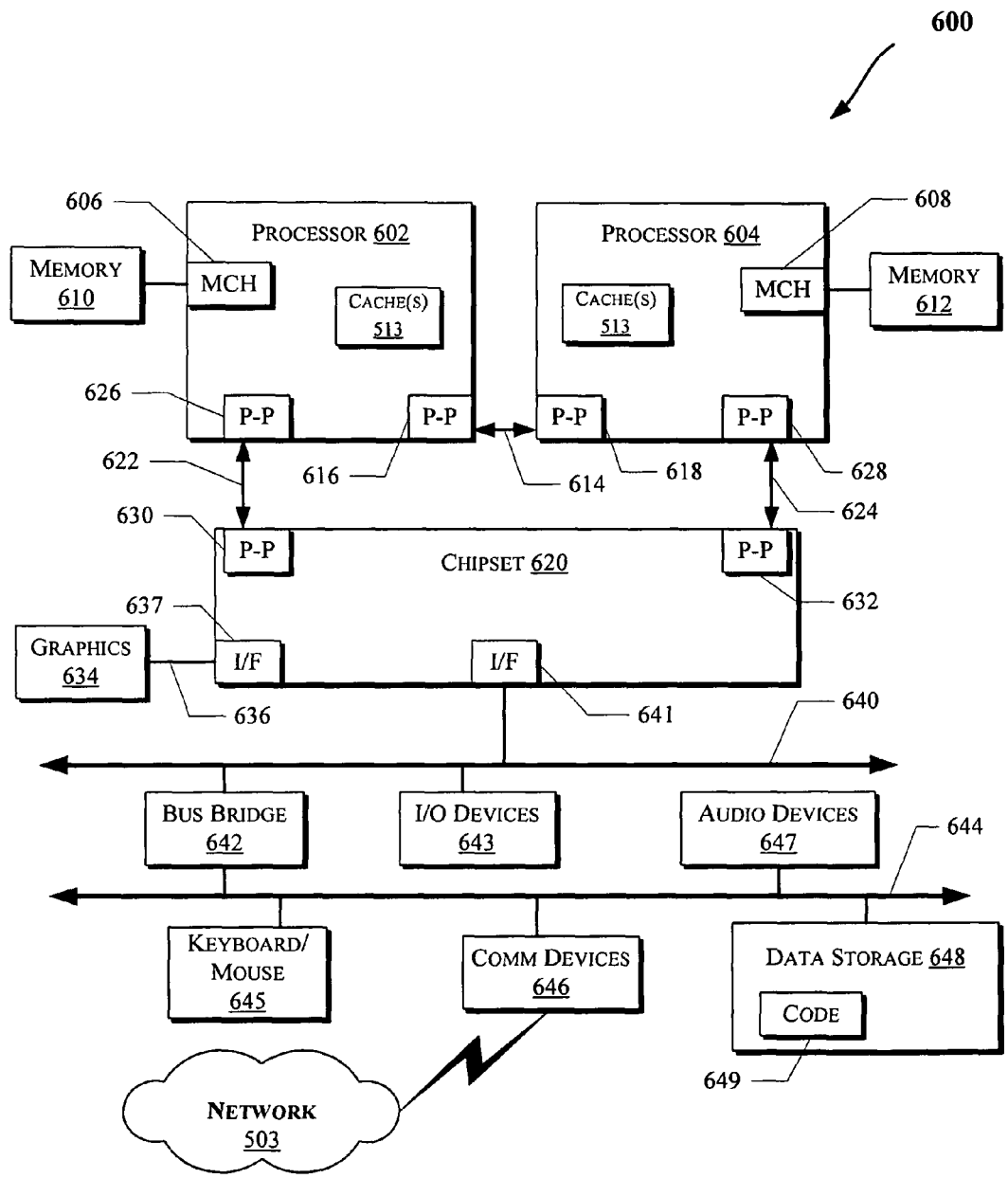

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5. As shown in FIG. 6, the processors 602 and 604 may also include the cache(s) 513 discussed with reference to FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637.

At least one embodiment of the invention may be provided within the processors 602 and 604 or chipset 620. Other embodiments of the invention, however, may exist in other circuits, logic units, or devices within the system 600 of FIG.

6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 643 may communicate with other devices such as a keyboard/mouse 645, communication devices 646 (such as modems, network interface devices, or other communication devices that may communicate with the computer network 503), audio I/O device, and/or a data storage device 648. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-6. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus comprising:
   a first logic circuitry to generate a signal to cause each of a plurality of communication links of a transmit agent to transmit a unique identifier over an interconnect;
   a second logic circuitry, responsive to the generated signal, to transmit data packets that comprise the unique identifier over the interconnect prior to one or more other data packets that await transmission over the interconnect;
   a third logic circuitry to determine a difference between a location of a first event and a location of the unique identifier, wherein the unique identifier is a nearest marker to the first event; and
   a fourth logic circuitry to capture one or more traces, wherein each trace is to correspond to data transmitted by one of the plurality of communication links, wherein the third logic circuitry is to determine a location of a second event based on an offsetting of the location of the first unique identifier in a corresponding trace of the captured one or more traces, wherein the interconnect comprises one or more serial links and wherein the one or more serial links adhere to one or more cache coherent protocols.

2. The apparatus of claim 1, wherein the first logic circuitry causes each of the plurality of communication links of the transmit agent to periodically transmit one of a plurality of sequential unique identifiers over the interconnect.

3. The apparatus of claim 1, further comprising a fifth logic circuitry to generate the unique identifier.

4. The apparatus of claim 1, further comprising a queue to store a packet comprising the unique identifier prior to dispatch of the stored packet over the interconnect.

5. The apparatus of claim 1, further comprising a fifth logic circuitry to format one or more of the data packets that comprise the unique identifier.

6. The apparatus of claim 1, further comprising a fifth logic circuitry to combine one or more of the data packets that comprise the unique identifier with at least one other type of data packet in a same traffic stream.

7. A system comprising:
   an interconnect to facilitate communication between a first agent and a second agent;
   a first logic to periodically generate a signal to cause each of a plurality of unique identifiers to sequentially transmit via each of a plurality of communication links of the first agent;
   a logic analyzer to capture one or more traces corresponding to data transmitted over the interconnect;
   a second logic to determine a difference between a location of a first event and a location of the unique identifier, wherein the unique identifier is a nearest marker to the first event,
   wherein each captured trace is to correspond to data transmitted by one of the plurality of communication links, wherein the logic analyzer is to determine a location of a second event based on an offsetting of the location of the first unique identifier in a corresponding trace of the captured one or more traces, wherein the interconnect comprises one or more serial links and wherein the one or more serial links adhere to one or more cache coherent protocols.

8. The system of claim 7, further comprising a third logic, responsive to the generated signal, to transmit data packets that comprise one of the plurality of unique identifiers over the interconnect prior to one or more other data packets that await transmission over the interconnect.

9. The system of claim 7, wherein the first logic causes each of the plurality of communication links of the transmit agent to periodically transmit one of the plurality of unique identifiers over the interconnect.

10. The system of claim 7, further comprising a third logic to generate the plurality of unique identifiers.

11. The system of claim 7, further comprising a plurality of queues to store packet comprising one of the plurality of unique identifiers prior to dispatch of the stored packets over the interconnect.

12. The system of claim 7, further comprising a third logic to format one or more data packets that comprise one of the plurality of unique identifiers.

13. The system of claim 7, further comprising an audio device.

14. The apparatus of claim 1, wherein a receiving agent, which receives the data packets with the unique identifier, is to ignore the data packets to allow for debug or validation based on the data packets.

15. The system of claim 7, wherein a receiving agent, which receives at least one of the plurality of unique identifiers, is to ignore a data packet that comprises the at least one unique identifier to allow for debug or validation based on the data packets.

* * * * *